United States Patent [19]

Coutard et al.

[11] 4,132,866
[45] Jan. 2, 1979

[54] CONCENTRATION NETWORK FOR A TIME DIVISION MULTIPLEX TELEPHONE EXCHANGE WITH PULSE AMPLITUDE MODULATION

[75] Inventors: Jean-Pierre G. Coutard, Courbevoie; Jean A. Picandet, Paris, both of France

[73] Assignee: Jeumont-Schneider, Puteaux, France

[21] Appl. No.: 860,079

[22] Filed: Dec. 13, 1977

[30] Foreign Application Priority Data

Dec. 29, 1976 [FR] France .................................. 76 39430

[51] Int. Cl.² .......................... H04Q 11/04; H04J 3/00
[52] U.S. Cl. ............................ 179/15 AQ; 179/18 FC
[58] Field of Search ........ 179/18 FC, 15 AT, 15 AQ, 179/15 BS, 15 AP

[56] References Cited

U.S. PATENT DOCUMENTS

| | | | |
|---|---|---|---|
| 3,809,819 | 5/1974 | Stephens | 179/15 AQ |
| 3,890,469 | 6/1975 | Kelly et al. | 179/15 AQ |

*Primary Examiner*—Thomas A. Robinson
*Attorney, Agent, or Firm*—Bacon & Thomas

[57] ABSTRACT

A network for a time-division multiplex-frame telephone exchange with pulse code modulation, the network being capable of connecting $2^{n+p+q}$ subscriber's lines (n,p,q being integers) to a plurality of coders, comprises a plurality of first multiplexers respectively connected to the subscriber's lines, a plurality of demultiplexers, two pairs of second multiplexers connected to the plurality of demultiplexers by odd and even buses, and cyclic control means for controlling said first and second multiplexers, said demultiplexers, and said coders.

1 Claim, 3 Drawing Figures

CONCENTRATION NETWORK FOR A TIME DIVISION MULTIPLEX TELEPHONE EXCHANGE WITH PULSE AMPLITUDE MODULATION

BACKGROUND OF THE INVENTION

The invention relates to a concentration network with pulse amplitude modulation (PAM), used in a time division multiplex telephone exchange for connection to a set of four coders of subscriber's lines divided into sub-groups of $2^n$ lines, $2^p$ sub-groups being combined into a "group", the total number of groups being $2^q$ (n, p and q being integers). The total number of subscriber's lines connected to the set of 4 coders by the concentration network according to the invention is therefore $2^{n+p+q}$ which, by way of example, can be more than 1000 subscriber's lines.

Hitherto it has been possible to concentrate only 512 subscriber's lines in 64 time slots. This restriction is due to the fact that the use of a PAM bus is limited since, when the bus exceeds a certain length substantially proportional to the number of subscriber's lines connected thereto, crosstalk (i.e. echo phenomena and overshooting which is damped too slowly) occurs between each pair of consecutive pulses. These effects become even worse when an increase is made in the number of time slots per frame conveyed by the PAM bus.

The concentration network according to the invention can obviate these disadvantages, since it concentrates the PAM pulses in a first and second bus alternately. In each bus, therefore, there is a wider spacing between each pair of consecutive pulses, so that crosstalk can be reduced and the bus length can be increased. For example, 1024 subscriber's lines can be connected to 4 multiplex lines having 32 time slots, which has hitherto been technologically impossible.

SUMMARY OF THE INVENTION

The concentration network according to the invention is characterized in that it comprises:

$2^{p+q}$ inputs respectively connected to the lines of $2^n$ subscribers;

$2^{p+q}$ demultiplexers, each of said demultiplexers having an input and odd and even outputs, each of said inputs being connected to a respective output of each of said first multiplexers;

two pairs of second multiplexers having $2^q$ inputs and each of said second multiplexers having an output connected to a different one of said plurality of coders;

$2^q$ first buses, each of said buses connecting the odd outputs of a group of $2^p$ demultiplexers to respective inputs of the first of said pairs of said second multiplexers;

$2^q$ second buses, each of said buses connecting the even outputs of a group of $2^p$ demultiplexers to respective inputs of the second of said pairs of said second multiplexers; and cyclic control means, having a predetermined cyclic duration equal to the duration of a multiplex-frame, for controlling said first and second multiplexers, said demultiplexers, and said plurality of coders, and the transmission of signals between them, wherein said cyclic control means receives operating instructions from said telephone exchange.

BRIEF DESCRIPTION OF THE DRAWINGS

The invention will be more clearly understood from the following embodiment and the accompanying drawings in which.

BRIEF DESCRIPTION OF THE PREFERRED EMBODIMENT

In the chosen example, n = 4, p = 2 and q = 4. The 1024 subscriber's lines are divided into 16 groups of 64 lines, each divided into four sub-groups each connected to 16 subscriber's lines.

Figure 1:
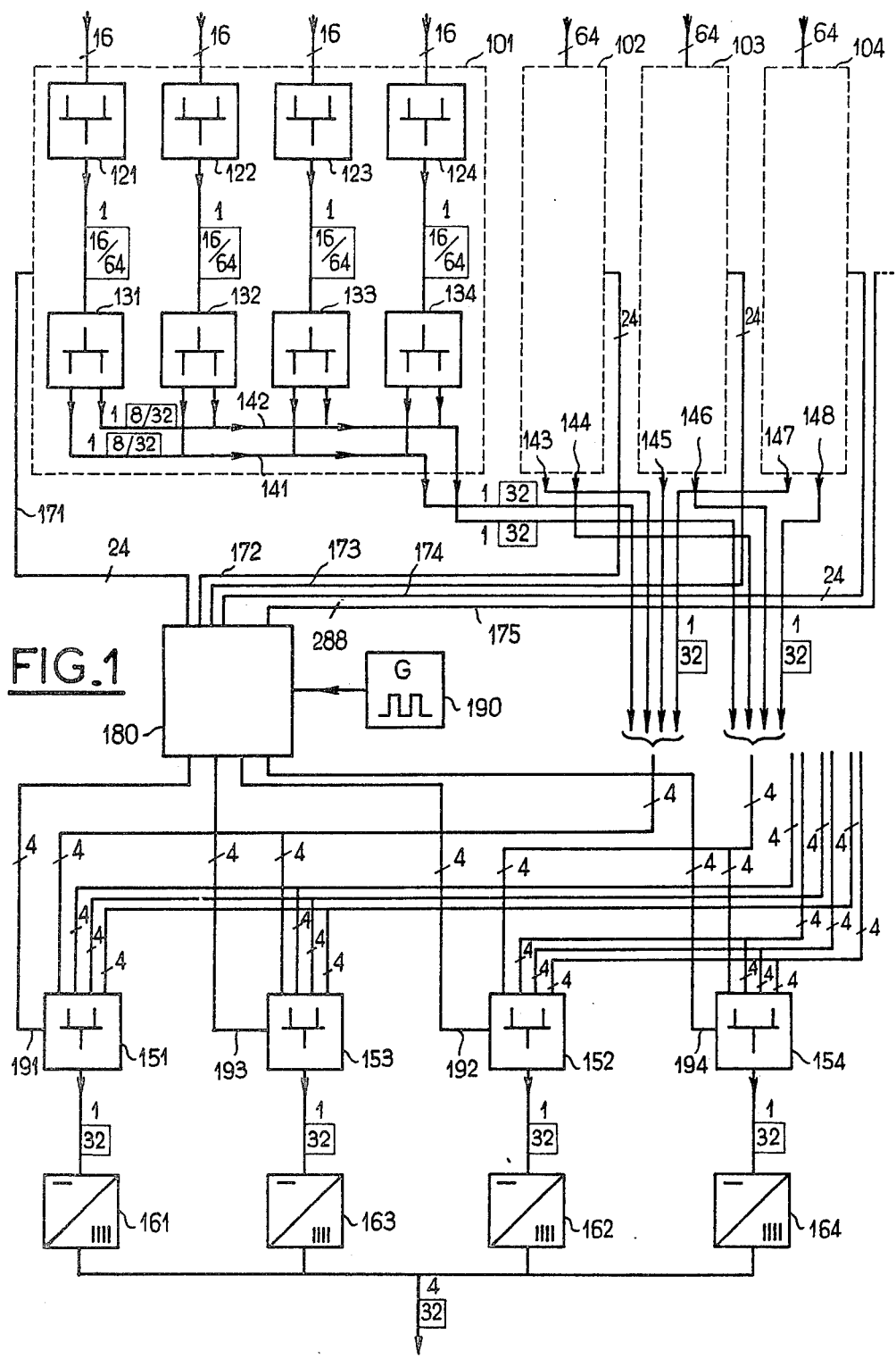
FIG. 1 is a block diagram of a concentration network for connecting 1024 subscriber's lines to 4 coders.

For simplicity, the top part of FIG. 1 shows only the wires coming from the subscriber's lines in the first four groups.

Each subscriber's line in a group is connected to a single input of what we shall call a "concentration group" having 64 inputs. In all, therefore, there are 16 identical concentration groups 101 to 116, only the first four groups 101 to 104 being shown in FIG. 1 each surrounded by a broken line.

To avoid overcrowding the diagram, only the concentration group 101 has been shown in detail. Group 101 comprises four multiplexers 121–124 having 16 inputs, each input being connected to a wire from a subscriber's line. The output of each multiplexer is connected to the input of a demultiplexer having two outputs, one of which we shall call "odd" and the other "even". The odd outputs of demultiplexers 131–134 are connected to a single bus 141 (called an "odd bus") and the even outputs are connected to an "even" bus 142. In all, therefore there are 16 odd buses such as 143, 145, 147 and 16 even buses such as 144, 146, 148 in the case of groups 102, 103, 104 respectively, The multiplex line connecting a multiplexer to the corresponding demultiplexer comprises a frame of 64 time slots, out of which only 16 can be used in a random distribution in the frame.

Each demultiplexer has three possible positions — i.e., it is either in the open position or closed on the odd bus 141 or closed on the even bus 142.

The binary gates of each demultiplexer are controlled so that, in a frame of 64 time slots, each pair of successive pulses are routed towards different buses 141 and 142.

Thus, the even and odd outputs of each demultiplexer each constitute a multiplex line corresponding to a frame 32 time slots, out of which only 8 are used in accordance with a random distribution in the frame.

The four odd buses 141, 143, 145, 147 are respectively connected to four inputs of a multiplexer 151 having 16 inputs and an output connected to the input of a coder 161, i.e. an analog-digital converter. The 12 other inputs of multplexer 151 are respectively connected to each odd bus of the 12 other groups 105–116 (not shown).

The inputs of another multiplexer 153, identiacl with 151, are respectively connected to the same odd buses as the inputs of 151. The output of multiplexer 153 is connected to the input of coder 163 identical with 161.

Similarly, the 16 even buses (out of which only the first four — 142, 144, 146, 148 — are shown) are respectively connected to the 16 inputs of two multiplexers 152, 154 identical with 151 and respectively connected to coders 162, 164 identical with 161.

Groups 101–104 are respectively controlled by 24-wire connections 171, 172, 173, 174 from a cyclic control device 180 associated with a time-base generator 190 having a cycle equal to the duration of a multiplex frame.

The 12 × 24 = 288 wires for controlling the 12 groups 105–116 not shwon in the drawing are indicated by a single-wire connection 175 coming from the aforementioned device 180.

The demultiplexers in a single group (e.g. 131, 132, 133 and 134) are controlled so that they never simultaneously deliver a pulse to the same bus (e.g. 141). Consequently, a bus forms a multiplex line having 32 time slots.

Device 180 also provides four other four-wire connections 191, 192, 193, 194 for controlling multiplexers 151, 152, 153, 154 respectively.

The two multiplexers 151 and 153, whose inputs are in parallel on the same odd buses, are controlled so that they never simultaneously operate on the same time slot of the same input, although they operate at the same time. Similar considerations apply to the two multiplexers 152 and 154, whose inputs are in parallel on the same even buses.

Consequently, the four connections connect the outputs of multiplexers 151, 152, 153, 154 to the inputs of coders 161, 162, 163, 164 respectively, each constituting a multiplex line having 32 time slots.

Thus, since there are four coders, we finally obtain four multiplex lines having 32 time slots at the coder outputs.

Figure 2:
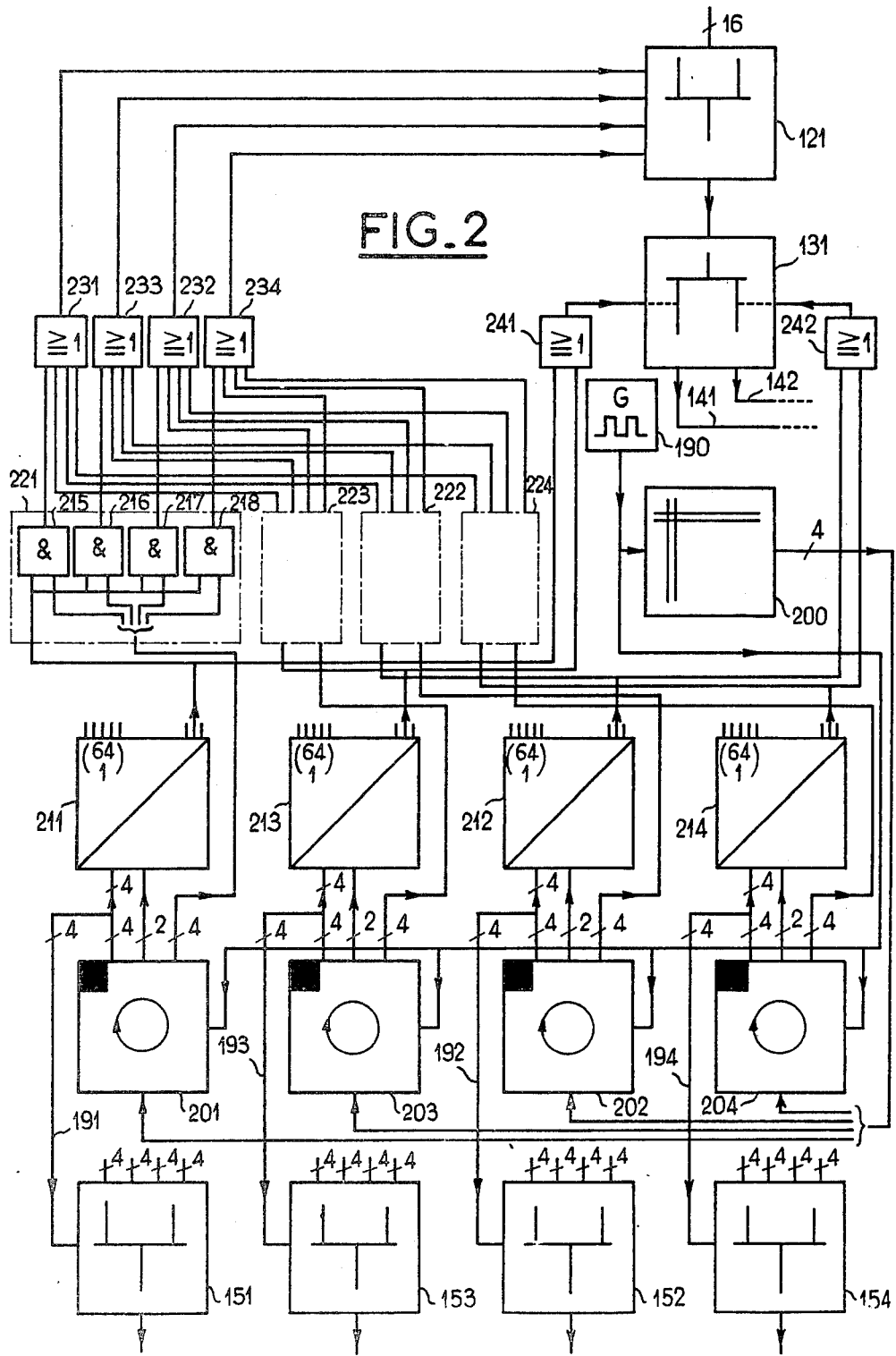
FIG. 2 shows the network control system.

FIG. 2 shows details of the cyclic control device 180. Whenever a subscriber X wishes to be connected to a subscriber, the central control unit 200 of the telephone exchange provides one of the four cyclic stores 201, 202, 203, 204 with the following: The address of the subscriber's line corresponding to X, the address of the coder (151, 152, 153 or 154) to which the set must be cyclically connected (the cycle of each store corresponds to the duration of a multiplex frame, e.g. 125 microseconds), the type of bus (even or odd) and the time slot to be used by the connection.

In practice, the central unit 200 only needs to determine the cyclic store to which it must send the address of X and the store position where the address is to be written in, since the choice of one out of the four stores will define both the coder and the type of bus selected. The position of the address in the store will define the serial number of the time slot allocated to the connection between X and Y.

Each cyclic store corresponds to a coder, and the coder rant corresponds to one type of bus; furthermore, each store has a number of positions equal to the number of time slots in a frame, i.e. 32 in the chosen example. The time base generator 190 associated with each cyclic control means is the same generator as that associated with the central control unit 200.

Since there are 1024 subscribers connected to the concentration network, 10 bits are necessary for each address. Four bits can be used to select an input out of 16 in a second-stage multiplexer 151–154, by means of connections 191–194 respectively.

Two other bits associated with the four preceding elements are converted in a code converter (one for each store) into a "one-out-of-64" code for selecting a first-stage multiplexer out of 64 multiplexers. In FIG. 2, by way of example, the four code converters 211, 212, 213, 214 have a penultimate output for selecting the multiplexer 121.

Finally, the last four bits of each address are used to select a subscriber's line out of the 16 connected to the inputs of multiplexer 121. To this end, the four wires corresponding to the four bits and coming from store 201 are respectively connected to one input of the four two-input AND logic elements 215, 216, 217, 218, the other input of each logic element being connected to the penultimate output of code converter 211.

The logic circuit comprising the four logic elements 215–218 is surrounded by a dot-and-dash line 221. It corresponds to store 201. The other stores 202–204 and code converters 212–214 are connected in the same manner to logic circuits 222, 223, 224 respectively, identical with circuit 221.

Four identical OR logic elements 231–234 have outputs for selecting a subcriber's line out of the sixteen lines connected to multiplexer 121. The logic elements have four inputs. The first are respectively connected to the outputs of AND logic elements 215, 216, 217, 218 of logic circuit 221, the second are connected to the outputs of the corresponding logic elements 223, the third are connected to the outputs of the corresponding logic elements in circuit 222 and the fourth are connected to the outputs of the corresponding logic elements in circuit 224.

For example, multiplexer 121 can be connected to the seventh subscriber's line via any store 201–204, but it cannot be so connected via a number of stores, since the program which enables the central unit 200 to write an address into one store prevents it from writing it in another store. Consequently logic elements 231–234 operate like exclusive OR circuits.

For the same reason, multiplexers 151 and 153 or 152 and 154 cannot operate simultaneously at a given moment on a single time slot of a single input.

Demultiplexer 131 closes on the odd bus 141 when actuated by the output of an OR binary operator 241 having two inputs, one of which is connected to the penultimate output of code converter 211 so that demultiplexer 131 is enabled at the same time as the associated multiplexer 121, whereas the other input is connected to the penultimate output of code converter 213. Thus, demultiplexer 131 closes on the odd bus 141 irrespective of whether multiplexer 121 is enabled by the "odd" store 201 or 203.

Similarly, demultiplexer 131 closes on the even bus 142 when actuated by the output of an OR binary operator 242 having two inputs, one of which is connected to the penultimate output of coder converter 212 whereas the other is connected to the penultimate output of code converter 214.

In short, in the case of any given store, only one multiplexer can be closed at a given time for a given address, whereas the associated demultiplexer is either closed on the even bus in the case of an "even" store (152 or 154) or closed on the odd bus in the case of an odd store (151 or 153).

Figure 3:
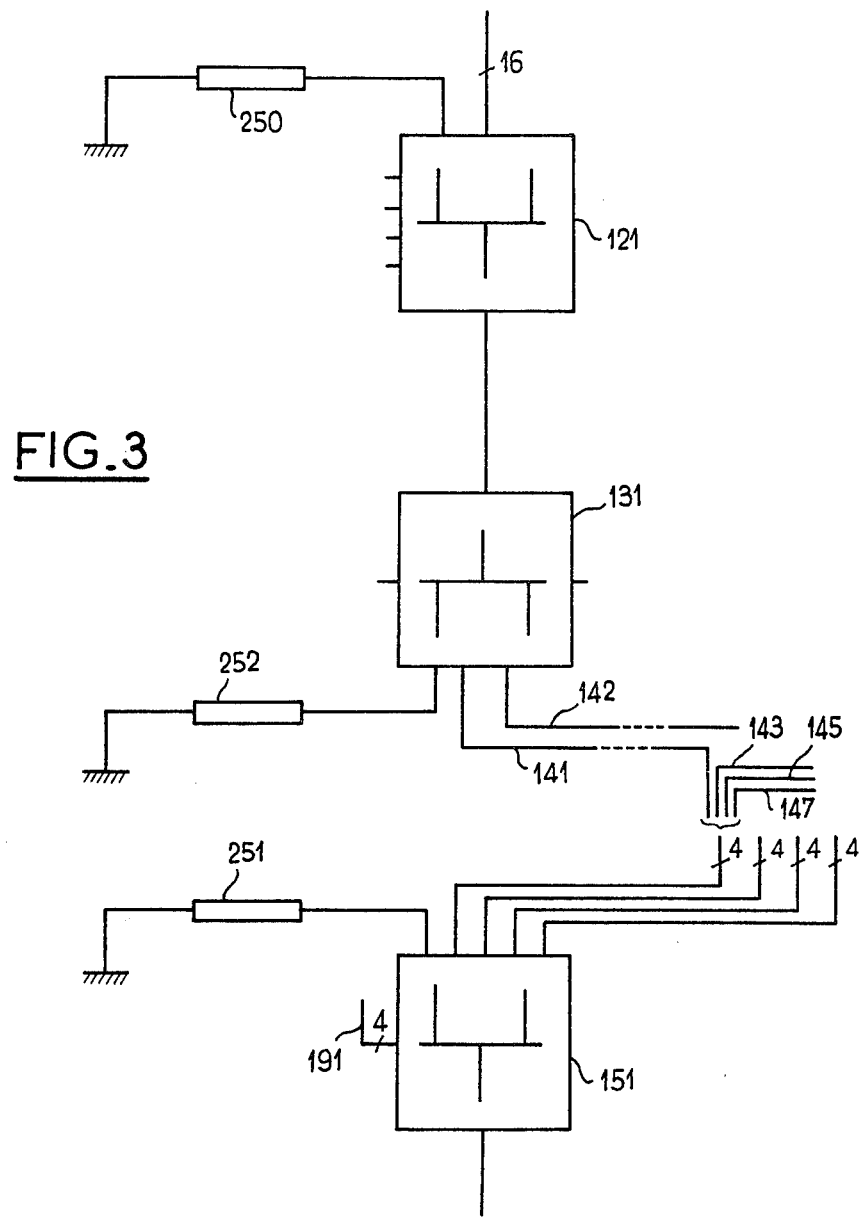
FIG. 3 shows another embodiment wherein the multiplexers and demultiplexers are connected to matching resistors.

An additional improvement can be made to the netword according to the invention (see FIG. 3) by (a) providing each multiplexer with an additional input connected to ground via a matching resistor (250 for multiplexer 121 and 251 for multiplexer 151), (b) providing each demultiplexer with an additional output connected to ground via a matching resistor (252 for demultiplexer 131) and (c) ensuring that the cyclic control device 180 connects each demultiplexer 131 to its matching resistor 252 whenever the demultiplexer is not closed on one of its even or odd outputs 141 or 152, and connects each multiplexer (121 or 151) to its matching resistor (250 or 251) whenever the multiplexer does not have to be connected to a subscriber's line, i.e. does not have to operate on a given time slot.

The network according to the invention can be used equally well when the pulses travel in the opposite direction, i.e. a connecting network can be inserted between the aforementioned concentration network and a network symmetrical therewith, i.e. in which the four coders are decoders, the multiplexers are demultiplexers and the demultiplexers are multiplexers.

In the general case, the cyclic control device comprises (a) for each of the four coders:

a cyclic store having a number of positions equal to the number of time slots in a multiplex frame, each position containing $n+p+q$ bits for writing in the addresses of the subscriber's lines to be connected to the coder, the store cycle having the same duration as a multiplex frame, a code converter for converting $p+q$ bits of each address into a one-out-of-$2^{p+q}$ code for selecting a first-stage multiplexer, q of the bits being used to select one of the $2^q$ inputs of the second-stage multiplexer associated with the aforementioned coder;

(b) for each of the $2^{p+q}$ multiplexers in the first stage:

four logic circuits respectively corresponding to the four cyclic stores, each comprising n AND logic elements having two inputs, the n first inputs being connected to one output of the code converter associated with the corresponding cyclic store (i.e. to the output selecting the aforementioned multiplexer) whereas the n second inputs are respectively placed in the same logic state as the n bits of the address given by the corresponding cyclic store, n OR logic elements having four inputs, the n first inputs being respectively connected to the n outputs of the AND logic elements of the first logic circuit, the n second inputs being connected to the outputs of the second logic circuit, the n thrid inputs being connected to the outputs of the third logic circuit and the n fourth inputs being connected to the outputs of the fourth logic circuit, the outputs of the aforementioned n OR logic elements selecting one out of $2^n$ subscriber's lines, and (c) for the demultiplexer associated with the aforementioned multiplexer:

a first OR binary operator having two inputs respectively connected to the same code converter outputs as the first inputs of the AND logic elements of the first two logic circuits, a second OR binary operator having two inputs respectively connected to the same code converter outputs as the first inputs of the AND binary operators of the last two logic circuits, the outputs of the first and second OR binary operator selecting the odd and even outputs respectively of the aforementioned demultiplexer, and a time base generator controlling the cyclic operation of the stores.

We claim:

1. A network for a time-division, multiplex-frame telephone exchange with pulse code modulation, the network being utilized to connect $2^{n+p+q}$ subscriber's lines (n,p,q integers) to a plurality of coders, comprising:

(a) $2^{p+q}$ first multiplexers, each of said multiplexers having $2^n$ inputs respectively connected to the lines of $2^n$ subscribers;

(b) $2^{p+q}$ demultiplexers, each of said demultiplexers having an input, and odd and even outputs, each of said inputs being connected to a respective output of each of said first multiplexers;

(c) two pairs of second multiplexers having $2^q$ inputs and each of said second multiplexers having an output connected to a different one of said plurality of coders;

(d) $2^q$ first buses, each of said buses connecting the odd outputs of a group of $2^p$ demultiplexers to respective inputs of the first of said pairs of said second multiplexers;

(e) $2^q$ second buses, each of said buses connecting the even outputs of a group of $2^p$ demultiplexers to respective inputs of the second of said pairs of said second multiplexers;

(f) different matching resistors connected between ground and respective additional inputs of each first and second multiplexers and said demultiplexers; and (g) cyclic control means, having a predetermined cyclic duration equal to the duration of a multiplex-frame, for controlling said first and second multiplexers, said demultiplexers, and said plurality of coders, and the transmission of signals between them, wherein said cyclic control means receives operating instructions from said telephone exchange and comprises:

(1) four coders, each coder comprising:

cyclic storing means having a number of positions equivalent to the number of time slots in one of said multiplex-frames, wherein each position contains $n+p+q$ bits, for storing the addresses of subscriber's lines to be connected to said coder, said cyclic storing means having a store cycle of the same duration of said multiplex-frame; and code converting means for converting $p+q$ bits of each address into a one-out-of-$2^{p+q}$ code for selecting one of said first multiplexers, and q bits being used to select one of the $2^q$ inputs of said second multiplexers respectively connected to said coder;

(2) a plurality of groups of four logic circuit means, each of said groups being connected to a separate one of said $2^{p+q}$ first multiplexers, each of said groups of four logic circuit means respectively corresponding to said four cyclic storing means, each of said logic circuit means comprising n AND logic elements, each AND logic element having two inputs with n first inputs being connected to one output of said code converting means connected to its respective cyclic storing means and wherein n second inputs are placed in the same logic states as the n address bits corresponding to said respective cyclic storing means;

(3) a plurality of groups of n OR logic elements, each of said groups of n OR logic elements being connected to a separate one of said $2^{p+q}$ first multiplexers, each of said OR logic elements having four inputs, the n first inputs being respectively connected to the n outputs of said AND logic elements of said first logic circuit means, the n second inputs being connected to the n outputs of said AND logic elements of said second logic circuit means, the n third inputs being connected to the n outputs of said AND logic elements of said third logic circuit means, and the n fourth inputs being connected to the n outputs of said AND logic elements of said fourth logic circuit means, whereby the outputs of said n OR logic elements select one output of $2^n$ subscriber's lines;

(4) a first OR binary operator having two inputs respectively connected to the same code converting means outputs as the first inputs of said AND logic elements of said first logic circuit means; and (5) a second OR binary operator having two inputs respectively connected to the same code converting means, as the first inputs of the AND logic elements of the third and fourth logic circuit means, wherein the outputs of said first and second OR binary operators select the odd and even outputs respectively of the respective $2^{p+q}$ demultiplexers, and wherein said cyclic control means connects each of said demultiplexers to their said additional input whenever the demultiplexer is not closed on one of its even or odd outputs; and connects each of said first and second multiplexers to their said additional input whenever said multiplexers do not have to be connected to a subscriber's line.

* * * * *

UNITED STATES PATENT AND TRADEMARK OFFICE
CERTIFICATE OF CORRECTION

PATENT NO. : 4,132,866
DATED : January 2, 1979
INVENTOR(S) : Jean-Pierre G. Coutard & Jean A. Picandet It is certified that error appears in the above-identified patent and that said Letters Patent are hereby corrected as shown below:

Column 2, line 62, change "identiacl" to —identical—.

Column 3, line 54, change "rant" to --rank--.

Column 4, lines 61-62, change "netword" to --network--.

Column 5, line 43, change "thrid" to --third--.

Signed and Sealed this

Eleventh Day of March 1980

[SEAL]

Attest:

SIDNEY A. DIAMOND

Attesting Officer          Commissioner of Patents and Trademarks